O. M. OWENS.
ANIMAL POKE.
APPLICATION FILED NOV. 6, 1920.
1,400,568.
Patented Dec. 20, 1921.
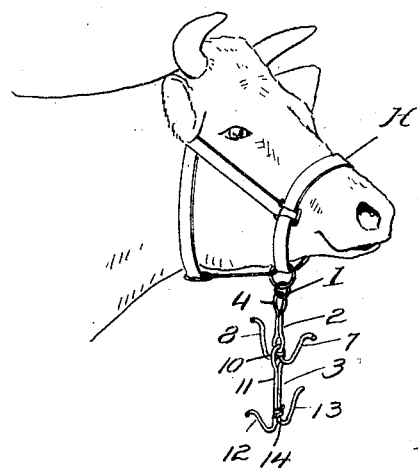
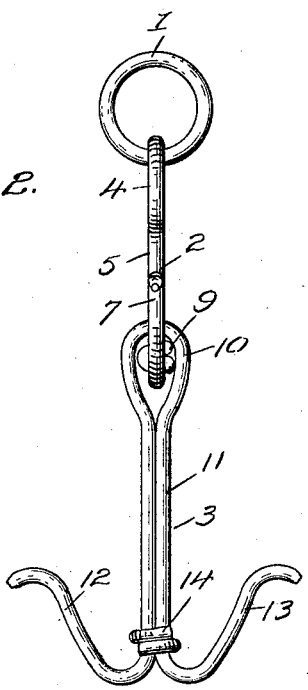
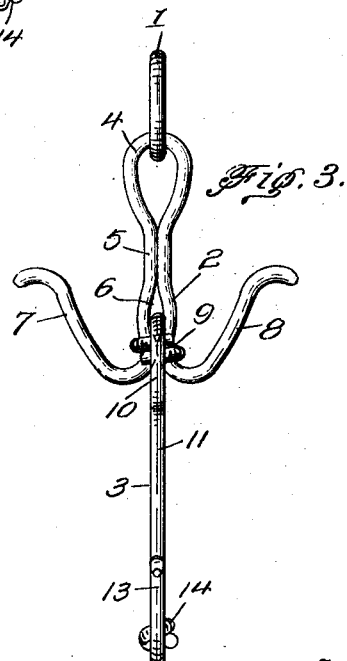

UNITED STATES PATENT OFFICE.

OSCAR M. OWENS, OF HOMER, GEORGIA.

ANIMAL-POKE.

1,400,568.     Specification of Letters Patent.     Patented Dec. 20, 1921.

Application filed November 6, 1920. Serial No. 422,264.

*To all whom it may concern:*

Be it known that I, OSCAR M. OWENS, a citizen of the United States, residing at Homer, in the county of Banks and State of Georgia, have invented certain new and useful Improvements in an Animal-Poke, of which the following is a specification.

The invention relates to animal pokes and more particularly to those adapted to be suspended from a halter of ordinary construction.

The object of the invention is to provide a device of this character so constructed that stock wearing them are prevented from forcing through or throwing their weight against fence wires.

Another object is to so construct such a poke as to lessen the pushing strength of the animal and also to render it impossible for the animal to get through the wire without hanging therein.

With these and other objects in view the invention consists in certain novel features of construction as hereinafter shown and described, and specifically pointed out in the claims.

In the accompanying drawing:

Figure 1 represents a perspective view of the poke constituting this invention shown applied.

Fig. 2 is an enlarged side elevation thereof detached, and

Fig. 3 is a similar view taken at right-angles to Fig. 2.

In the embodiment illustrated the poke constituting this invention comprises a plurality of hook carrying members 2 and 3 loosely connected and carried by an attaching ring 1 which is designed to be engaged with a halter strap under the chin of the animal as is shown in Fig. 1.

Two hook carrying members are here shown although obviously more may be employed if found desirable to do so and they are each constructed of a piece of heavy wire bent respectively to form attaching loops 4 and 10 which merge into shanks 5 and 11 and are provided at their lower ends with oppositely extending beaks, the member 2 having beaks 7 and 8 while the member 3 has similar beaks 12 and 13. The shanks of the members are formed by arranging the wires parallel with each other, shank 5 of member 2 having a loop 6 at its lower end to receive the loop 10 of member 3. The lower ends of the wires forming shank 5 of member 2 adjacent the junction therewith of beaks 7 and 8, are secured together by a piece of wire 9 coiled therearound and the lower ends of the wires of shank 11 are similarly connected by a piece of wire 14.

It will thus be seen that each of the members 2 and 3 is formed by bending a piece of wire intermediate its ends to form the loops 4 and 10 and then extending and bending them in the manner above described to form the shanks and beaks. When the loop 10 of member 3 is connected with member 2 the beaks of said member will extend in planes at rightangles with those of member 2 and thus present hooks on all sides of the poke for engagement with a fence wire should the animal succeed in passing its head between the strands of the wire fence and avoid all possiblity of its head being inserted beyond a predetermined point. The flexible or loose connection of the members 2 and 3 with each other and the loose connection of link 1 with the halter and with member 2 prevents the animal throwing its weight against the fence wires and insures the entangling of one of the beaks with such wires. This poke when connected as shown and described will reliably prevent breachy cattle from breaking through fences.

The preferred embodiment of the invention is disclosed in the drawings and set forth in the specification, but it will be understood that any modification within the scope of the claimed invention may be made in the construction without departing from the principle of the invention or sacrificing any of its advantages.

What is claimed is:

1. A device of the class described comprising a plurality of longitudinally arranged loosely connected hooks with the beaks thereof extending in planes at right-angles to each other, and means for loosely connecting one of said hooks to a support.

2. A device of the class described comprising hooks each having a shank with a plurality of beaks extending in opposite directions from one end and a loop at the other end, the shank loop of one hook being loosely connected with the beak carrying end of the other, the connection between the hooks being such that the beaks of one will extend in planes at rightangles to those of the other.

3. An animal poke comprising a plurality of loosely connected hooks each being composed of a piece of heavy wire bent intermediate its ends to form a loop and with the members thereof arranged parallel to form a shank and then bowed to form another link, the terminals of said wires being bent in opposite directions to form beaks, and means for securing the members of the shank in engaged relation.

4. An animal poke comprising a plurality of loosely connected hooks each of which is composed of a piece of heavy wire bent intermediate its ends to form a connecting loop the members of the wire being arranged parallel to form a shank for the hook and the terminals bent in opposite directions to form beaks, the shank of one of said members having a loop formed adjacent its beaks to receive the end loop of the other member, and wires wrapped around the shanks of said members adjacent their beaks to hold them in operative position.

In testimony whereof, I affix my signature hereto.

OSCAR M. OWENS.